US011089499B2

(12) United States Patent
Lin et al.

(10) Patent No.: US 11,089,499 B2
(45) Date of Patent: Aug. 10, 2021

(54) CANDIDATE BEAM DETECTION IN DRX MODE

(71) Applicant: MEDIATEK INC., Hsin-Chu (TW)

(72) Inventors: Hsuan-Li Lin, Hsin-Chu (TW); Tsang-Wei Yu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/835,729

(22) Filed: Mar. 31, 2020

(65) Prior Publication Data

US 2020/0314675 A1 Oct. 1, 2020

Related U.S. Application Data

(60) Provisional application No. 62/827,249, filed on Apr. 1, 2019.

(51) Int. Cl.
*H04W 24/10* (2009.01)
*H04W 52/02* (2009.01)

(52) U.S. Cl.
CPC ....... *H04W 24/10* (2013.01); *H04W 52/0216* (2013.01)

(58) Field of Classification Search
CPC ... H04W 24/10; H04W 52/0216; Y02D 30/70
See application file for complete search history.

(56) References Cited

U.S. PATENT DOCUMENTS

| 2018/0255607 A1* | 9/2018 | Nagaraja ............... H04L 5/0048 |
| 2019/0200249 A1 | 6/2019 | Yoon et al. |
| 2019/0335522 A1 | 10/2019 | Zhang et al. |

(Continued)

FOREIGN PATENT DOCUMENTS

| WO | WO2018027904 A1 | 2/2018 |
| WO | WO2018143776 A1 | 8/2018 |
| WO | WO-2020007037 A1 * | 1/2020 ........ H04W 52/028 |

OTHER PUBLICATIONS

International Search Report and Written Opinion of International Search Authority for PCT/CN2020/082760 dated Jun. 30, 2020 (8 pages).

(Continued)

*Primary Examiner* — Julio R Perez

(74) *Attorney, Agent, or Firm* — Imperium Patent Works; Helen Mao; Zheng Jin

(57) ABSTRACT

Apparatus and methods are provided for candidate beam detection (CBD) in DRX mode. In one novel aspect, the CBD evaluation period uses the uniformed scaling factor and the base period for the CBD evaluation period is the same when no DRX is configured and when the DRX is configured with DRX cycle length smaller than or equals to a predefined threshold. In one embodiment, the UE receives DRX configuration including a DRX cycle length, determines a base period for an evaluation period of CBD measurements based on the DRX cycle length and determines a multiplicator for the evaluation period based on a scaling factor and one or more measurement factors, and performs CBD measurements based on the evaluation period, wherein the evaluation period is based on the determined base period and the multiplicator. In one embodiment, the scaling factor is the same for all DRX configurations.

14 Claims, 5 Drawing Sheets

(56) References Cited

U.S. PATENT DOCUMENTS

2019/0387470 A1* 12/2019 Nam ................. H04W 52/0216
2019/0394660 A1* 12/2019 He ........................ H04W 16/28
2020/0053824 A1*  2/2020 He ........................ H04W 24/08
2020/0314675 A1* 10/2020 Lin ....................... H04W 24/10
2020/0413273 A1* 12/2020 Turtinen ............... H04W 76/28

OTHER PUBLICATIONS

R4-1811126 3GPP TSG-RAN WG4 Meeting #88, Nokia et al., "Candidate beam detection for beam failure recovery", Gothenburg, Sweden, Aug. 20-24, 2018 (2 pages).

* cited by examiner

CANDIDATE BEAM DETECTION IN DRX MODE

CROSS REFERENCE TO RELATED APPLICATIONS

This application claims priority under 35 U.S.C. § 119 from U.S. Provisional Application No. 62/827,249 filed on Apr. 1, 2019, titled "BEAM DETECTION IN DRX MODE," the subject matter of which is incorporated herein by reference.

TECHNICAL FIELD

The disclosed embodiments relate generally to wireless communication, and, more particularly, to beam detection in discontinuous reception (DRX) mode.

BACKGROUND

The bandwidth shortage increasingly experienced by mobile carriers has motivated the exploration of the new radio (NR) network with multi-beam technology. In the NR network, the measurement for uplink (UL) and downlink (DL) and the measurement report needs to adapt to meet the requirement. For example, beam sweeping is required for measurement. The traditional measurement and measurement report mechanisms, such as radio link monitoring (RLM) and radio resource management (RRM) do not meet the requirement due to the multi-beam operation for the NR network.

Candidate beam detection (CBD) is part of a procedure of link recovery, such as beam failure recovery (BFR). Through the CBD measurements, the UE can report good beam to the network once the beam failure was detected. In order to have fast responses to the changes of the environment, fast beam recovery for the CBD is required. On the other hand, frequent CBD measurements may greatly impact power consumption of the UE. The balance and optimization of CBD is important.

Improvements and enhancements are required for CBD in the DRX mode.

SUMMARY

Apparatus and methods are provided for candidate beam detection (CBD) in DRX mode. In one novel aspect, the CBD evaluation period uses the uniformed scaling factor and the base period for the CBD evaluation period is the same when no DRX is configured and when the DRX is configured with DRX cycle length smaller than or equals to a DRX cycle length threshold. In one embodiment, the UE receives DRX configuration including a DRX cycle length. The UE determines a base period for an evaluation period of CBD measurements based on the DRX cycle length and determines a multiplicator for the evaluation period based on a scaling factor and one or more measurement factors. The UE performs CBD measurements based on the evaluation period, wherein the evaluation period is based on the determined base period and the multiplicator. In one embodiment, the UE further receives CBD configuration including a reference signal (RS) periodicity, wherein the base period is the RS periodicity when a DRX cycle length is smaller than a DRX cycle length threshold, and the base period is the DRX cycle length when the DRX cycle length is greater than the DRX cycle length threshold. In one embodiment, the RS periodicity is a synchronization signal block (SSB) periodicity for SSB based CBD and a channel state information reference signal (CSI-RS) periodicity for CSI-RS based CBD. In another embodiment, the scaling factor is the same for all DRX configurations. In one embodiment, the scaling factor is the same for all DRX configurations. In another embodiment, the one or more measurement factors is a measurement factor P for frequency range-1 (FR1). In yet another embodiment, the one or more measurement factors are a measurement factor P and a measurement factor N for frequency range-2 (FR2). In one embodiment, the DRX cycle length threshold is predefined in a specification for the wireless network. In another embodiment, the performing CBD measurements is triggered by detecting a beam failure condition.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
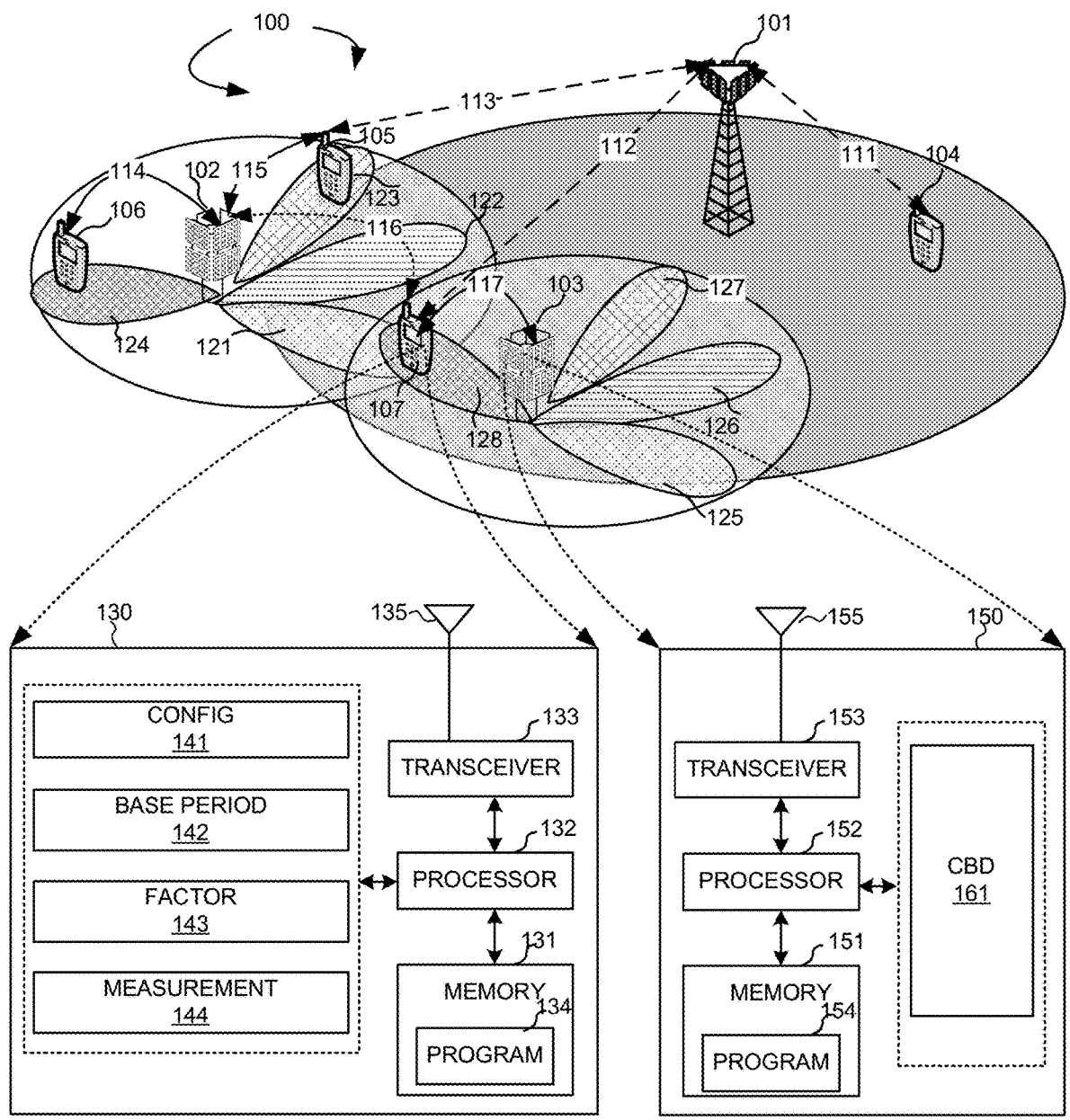
FIG. 1 is a schematic system diagram illustrating an exemplary wireless network with candidate beam detection in DRX mode in accordance with embodiments of the current invention.

FIG. 1 is a schematic system diagram illustrating an exemplary wireless network with candidate beam detection in DRX mode in accordance with embodiments of the current invention. NR wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve several mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are multibeam base station, the serving area of which may overlap with the serving area of eNB 101, as well as may overlap with each other at the edge. If the serving area of multibeam eNB does not overlap the serving area of macro eNB, the multibeam eNB is considered as standalone, which can also provide service to users without the assistance of macro eNB. multibeam eNB 102 and multibeam eNB 103 has multiple sectors each with multiple control beams to cover a directional area. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with multibeam NR base station only, which is covered by control beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In one embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. These function modules can be implemented in software, firmware or hardware. Configuration circuit 141 receives configuration including a DRX cycle length. Configuration circuit 141 further receives CBD configuration including a reference signal (RS) periodicity, wherein the base period is the RS periodicity when a DRX cycle length is smaller than a DRX cycle length threshold, and the base period is the DRX cycle length when the DRX cycle length is greater than the DRX cycle length threshold. Base period circuit 142 determines a base period for an evaluation period of CBD measurements based on the DRX cycle length. Factor circuit 143 determines a multiplicator for the evaluation period based on a scaling factor and one or more measurement factors. Measurement circuit 144 performs CBD measurements based on the evaluation period, wherein the evaluation period is based on the determined base period and the multiplicator.

Similarly, eNB 103 has an antenna 155, which transmits and receives radio signals. An RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. CBD module 161 communicates with the UEs and performs CBD configuration, measurement and reporting procedures.

Candidate beam detection is an important for link recovery. The CBD can be based on synchronization signal block (SSB) or channel station information reference signal (CSI-RS) measurements. Through CBD measurement, the UE can report good beam to the network once the beam failure is detected. The beam failure detection (BFD) is to monitor radio link quality of a beam. BFD would trigger beam failure and link recovery procedure. In one embodiment, upon detecting a beam failure during the BFD, the CBD is triggered. UE performs CBD measurement during a CBD evaluation period. The evaluation period of CBD needs to consider both the requirement for fast beam recovery as well as power consumption.

Figure 2:
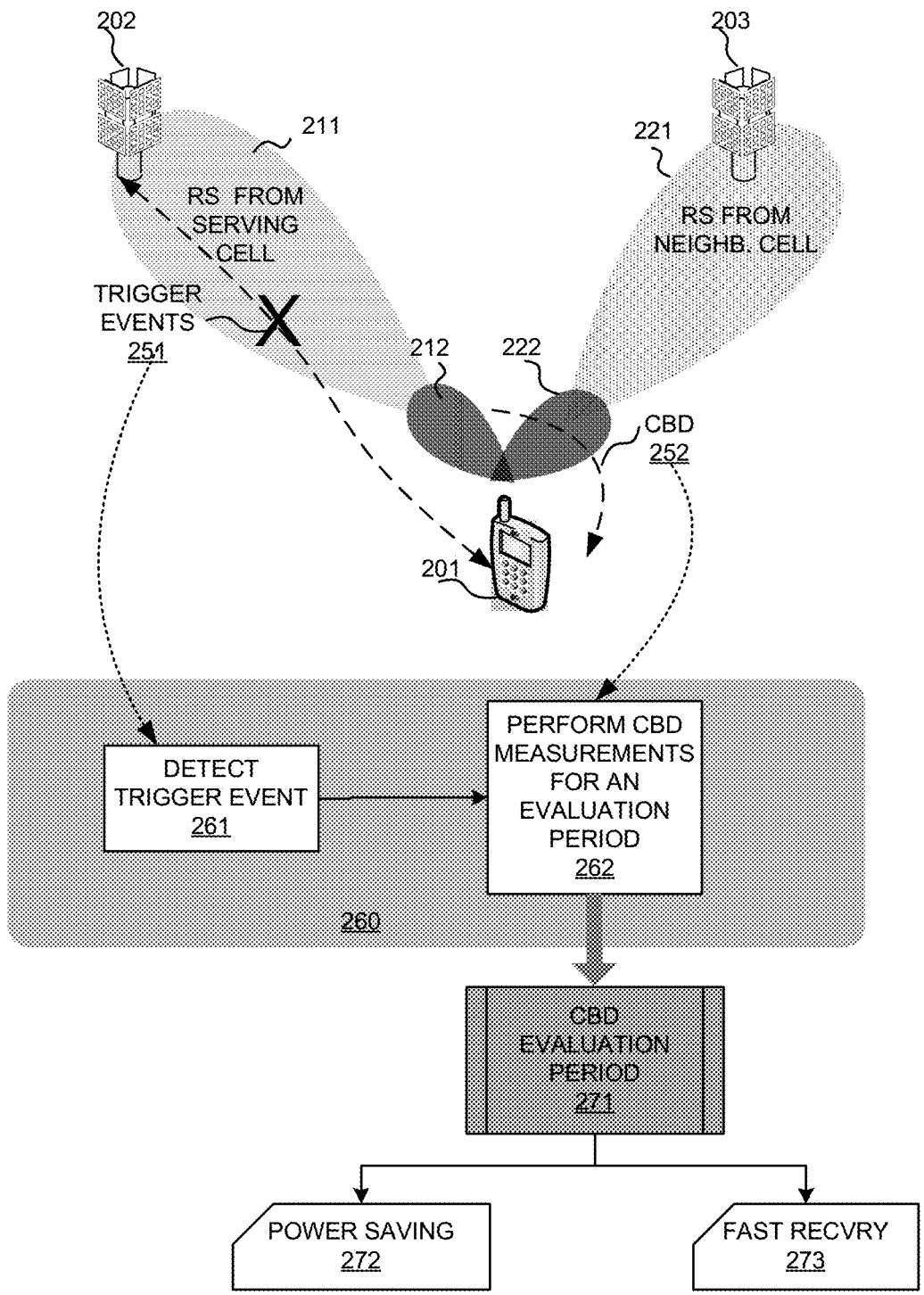
FIG. 2 illustrates exemplary diagrams for a UE to perform CBD with an evaluation period considering both the fast recovery and power consumption in accordance with embodiments of the current invention.

FIG. 2 illustrates exemplary diagrams for a UE to perform CBD with an evaluation period considering both the fast recovery and power consumption in accordance with embodiments of the current invention. UE 201 is connected with a serving cell 202 with beam 211 in a wireless network. The UE may operate in frequency range-1 (FR1), which is in the range of smaller than 6 GHZ or 7 GHz. The UE may also operate in frequency range-2 (FR2), which is in the range of about 28 GHz where millimeter wave (mmW) resides. The UE performs measurement based on L1-RSRP resources such as the synchronization signal block (SSB) resources or the channel state information reference signal (CSI-RS) resources with beam 212. UE 201 can perform measurements on neighbor cell beams, both in the FR1 and FR2. UE 201 measures SSB neighboring cell beam 221. UE 201 performs L1-RSRP with beam 222. In an NR network, the UE is configured with SSB measurement timing configuration (SMTC) and measurement gap (MG). The SS/PBCH block (SSB) burst consists of multiple SSB-s, which are associated with the different SSB indices and potentially with the different transmission beams. Besides, the CSI-RS signals can also be configured for beam management and measurement. The SMTC with a certain duration and periodicity is used to indicate the UE measurement on the certain resources to reduce the UE power consumptions. Within the SMTC period and on the configured SSB and/or CSI-RS, UE will conduct the L1-RSRP/RLM/RRM measurement. Measurement gap is configured to create a small gap during which no transmission and reception would happen. Since there is no signal transmission and reception during the gap, the UE can switch to the target cell and perform the signal quality measurement and come back to the current cell. Once such original L1-RSRP measurement period overlaps with the SMTC and/or MG, the L1-RSRP measurement may not be able to be performed in MG nor be performed with proper RX beam for serving cells within SMTC window, since UE would try different RX beams for other neighboring cells. Therefore, the original L1-RSRP measurement period should be extended by a measurement factor P to become a new L1-RSRP measurement period in FR1 and FR2 to handle the RS overlapping.

In one novel aspect, CBD evaluation period is determined based on the DRX configuration. DRX is configured to let UE get into sleeping mode for a DRX-OFF period and wake up again for a DRX-ON period, also called the ON Duration, to check if there is any data coming from the network and getting into sleeping mode again if there is no data. The DRX cycle length, which is duration of the DRX-OFF period plus the DRX-ON period, is configured by the network. The CBD evaluation period is determined based on the configured DRX cycle length for the UE as well as other factors such as the operating frequency range, the reference signal type and other measurement factors such as P factor and N factor. In one embodiment, at step 251, the UE detects trigger event. At step 252, the UE starts CBD. In one embodiment, the trigger event is detection of a beam failure by the UE.

A CBD procedure 260 illustrates a top-level process of the CBD in accordance to embodiments of the current invention. At step 261, the UE detects one or more trigger events for the CBD. In one embodiment, the trigger event is a beam failure detection. At step 262, the UE performs CBD measurement for an evaluation period. In one embodiment, the CBD configuration, including the evaluation period for the CBD is configured before the detection of the trigger event. At step 271, the UE receives RRC configuration and configures the CBD evaluation period based on the received configuration.

In one novel aspect, CBD evaluation period configuration 271 provides optimized trade-off between power saving 272 and fast beam recovery 273. The CBD evaluation period is configured to be based on a RS periodicity, which is a shorter evaluation period to provide fast recovery 273 upon detecting a trigger event. In another scenario, the CBD evaluation period is configured based on the DRX cycle length, which is a longer evaluation period for better power consumption 272. The better power consumption can be achieved to balance the fast recovery in scenarios when fast beam tracking is less demanding, such as the data traffic is low. In one embodiment, the determination of using the shorter evaluation or the longer evaluation period is based on the DRX cycle length. When the DRX cycle length is shorter than a predefined threshold, the evaluation period uses the same shorter evaluation period configuration as when the DRX is not configured. It is advantageous to use shorter evaluation period when DRX cycle length is short because the power saving under such DRX configuration is not significant. Upon performing the CBD measurements during the CBD evaluation period, UE delivers the configured index of CBD reference signal and the corresponding CBD measurement result to higher layers of UE, provided the CBD measurement result is better than a configured RSRP threshold.

Figure 3:
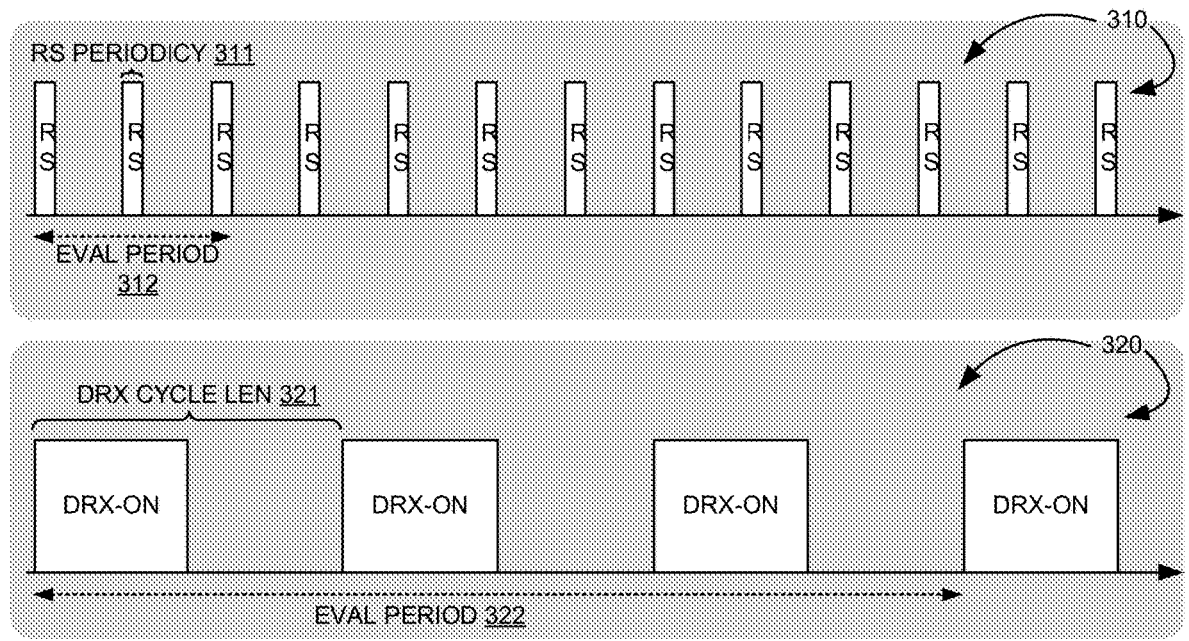
FIG. 3 illustrates exemplary diagrams CBD evaluation period based on RS periodicity and DRX cycle length in accordance with embodiments of the current invention.

FIG. 3 illustrates exemplary diagrams CBD evaluation period based on RS periodicity and DRX cycle length in accordance with embodiments of the current invention. In one novel aspect, the evaluation period for the CBD is based on a base period and a multiplicator. In one embodiment, the base period is either a RS periodicity or a DRX cycle length. The base period for the CBD evaluation period is determined based on the configured DRX cycle length. The UE may operate in either FR1 or FR2. A RS configuration 310 shows an exemplary diagram for a periodically scheduled RS signal across the time domain with a RS periodicity 311. The RS periodicity is a BBS periodicity when the CBD is a BBS based measurement. In one embodiment, the SSB periodicity is the periodicity of SSB in the set $\bar{q}_1$. The RS periodicity is a CSI-RS periodicity when the CBD is a CSI-RS based measurement. In one embodiment, the CSI-RS periodicity is the periodicity of CSI-RS in the set $\bar{q}_1$. Based on the configuration of the DRX cycle length, the CBD evaluation period is a scaling multiple of the RS periodicity. Upon determining the base period for the CBD evaluation period is a RS precocity, such as an SSB periodicity or a CSI-RS periodicity, the evaluation period 312 is configured as a multiple of the base period. The multiplicator is determined based on UE configurations.

In another scenario, a DRX configuration 320 shows an exemplary diagram for a DRX in the time domain with DRX cycle length 321. The CBD measurement performs during the DRX-ON durations. In some embodiments, the CBD with DRX configuration can be either an SSB based measurement or a CSI-RS based measurement. During DRX-OFF period, the scheduled RS are not measured. The CBD evaluation period is based on DRX cycle length when the DRX cycle length is greater than a predefined threshold. When the DRX is configured but with DRX cycle length 321 smaller than or equals to the predefined threshold, the base period for the evaluation period is the same as when the DRX is not configured, in which case it is the RS periodicity. Upon determining the base period for the CBD evaluation period is the DRX cycle length 321, the evaluation period 322 is configured as a multiple of the base period. The multiplicator is determined based on UE configurations.

Figure 4:
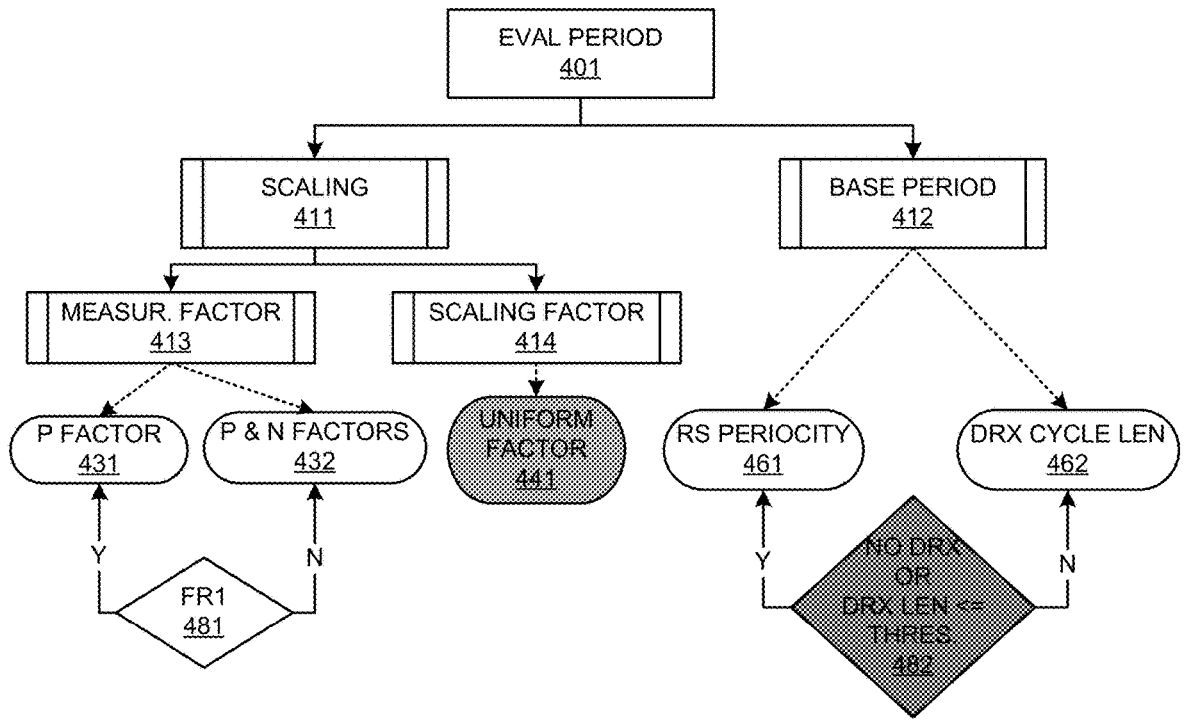
FIG. 4 illustrates exemplary diagrams for configuration of the evaluation period for the CBD based on the DRX configuration in accordance to embodiments of the current invention.

FIG. 4 illustrates exemplary diagrams for configuration of the evaluation period for the CBD based on the DRX configuration in accordance with embodiments of the current invention. In one novel aspect, the evaluation period for the CBD is configured to balance the requirement for the fast beam recovery as well as for optimized power consumption. Evaluation period 401 is determined based on scaling 411 and base period 412. Scaling 411 is a multiplicator. Scaling 411 has one or more measurement factors 413 and a scaling factor 414. Conventionally, scaling factor 414 is different for different DRX configuration since the conventional configuration for the evaluation period uses different base periods for scenarios of no DRX configured and DRX configured with a DRX cycle length smaller than the predefined DRX cycle length threshold. In the conventional way, thereby, the base period for no DRX configured is the RS periodicity, while the base period for DRX cycle length smaller than or equals to the predefined DRX cycle length threshold is the DRX cycle length, which is the same as when the DRX cycle length is configured to be greater than the predefined DRX cycle length threshold. Since the conventional configuration for the evaluation period has the same base period for any DRX cycle length, the scaling factor is different based on the DRX cycle length. In one novel aspect, the base period is the same for both the DRX cycle length smaller than or equals to the predefined DRX cycle length threshold and no DRX configured. The scaling factor are the same for all DRX configurations. Scaling factor 414 uses the uniformed factor 441 for any DRX configuration. Measurement factor 413 for scaling 411 is one or more measurement factors based the FR configuration. At step 481, the UE determines whether the CBD is for FR1 or FR2. If step 481 determines it is for FR1, measurement factor 413 is the P factor 431. If step 481 determines it is for FR2, measurement factor 413 is P factor and N factor 432. Scaling 411 for evaluation period 401 is based on the operating frequency range, whether it is FR1 or FR2 and uses a uniformed scaling factor and either the P factor only for FR1 or both the P factor and N factor for FR2.

Base period 412 is determined based on the DRX configuration. In one embodiment, the base period is the same when there is no DRX configured and when the configured DRX cycle length is smaller than or equals to a predefined threshold. In one embodiment, the predefined DRX cycle length threshold is 320 ms. Step 482 determines whether there is no DRX configured or the configured DRX cycle length is smaller than or equals to the predefined DRX cycle length threshold. If step 482 determines yes, base period 412 is configured to be the RS periodicity 461. In one embodiment, RS periodicity 461 is the SSB periodicity when the CBD performs the SSB based measurements, or RS periodicity 461 is the CSI-RS periodicity when the CBD performs the CSI-RS based measurements. If step 482 determines no, base period 412 is DRX cycle length 462.

Figure 5:
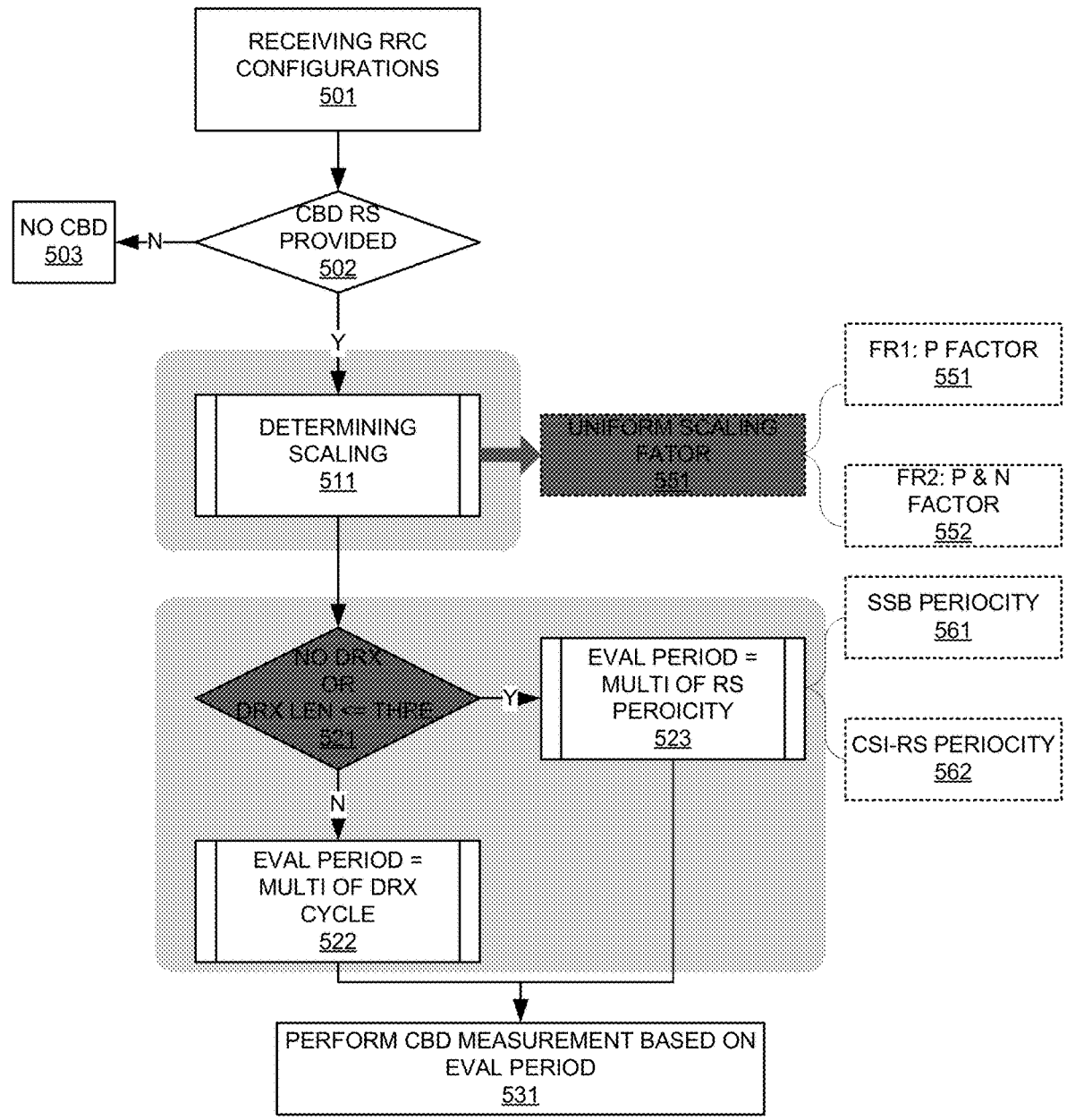
FIG. 5 illustrates exemplary diagrams for CBD with DRX with evaluation period configured based on DRX configuration with the balanced approach for the power consumption and fast beam recovery in accordance with embodiments of the current invention.

FIG. 5 illustrates exemplary diagrams for CBD with DRX with evaluation period configured based on DRX configuration with the balanced approach for the power consumption and fast beam recovery in accordance with embodiments of the current invention. At step 501, the UE receives RRC configurations. In one embodiment, the RRC configuration includes DRX configuration. At step 502, the UE determines whether CBD is configured by the network based on the RRC configurations. If step 502 determines no, the UE enters step 503 and performs and prepares no CBD. If step 502 determines yes, the UE performs procedure 510 to determine the scaling for the evaluation period for the CBD, step 520 to determine the base period for the evaluation period for the CBD. Subsequently, the UE performs CBD measurement upon detecting one or more triggering events based on the configured evaluation period using the determined scaling and base period in steps 510 and 520, respectively.

Scaling determination 510 includes step 511 to determine scaling for the evaluation period. In one novel aspect, a uniformed scaling factor 512 is used to determine scaling. Step 551 uses measurement factor P factor for scaling if the UE operates in FR1. Step 552 uses measurement factor P factor and N factor for scaling if the UE operates in FR2. Base period determination 520 includes step 521 to determine whether there is no DRX configured or the DRX is configured with a DRX cycle length of smaller than or equals to a predefined DRX cycle length threshold. If step 521 determines yes, the base period is determined to be the RS periodicity and the evaluation period for CBD is the base period multiplied by the scaling determined in step 520. The RS periodicity is the SSB periodicity 561 if the UE performs SSB based CBD measurement. The RS periodicity is the CSI-RS periodicity 562 if the UE performs CSI-RS based CBD measurement. If step 521 determines no, the base period is determined to be the DRX cycle length and the evaluation period for CBD is the base period multiplied by the scaling determined in step 520.

Figure 6:
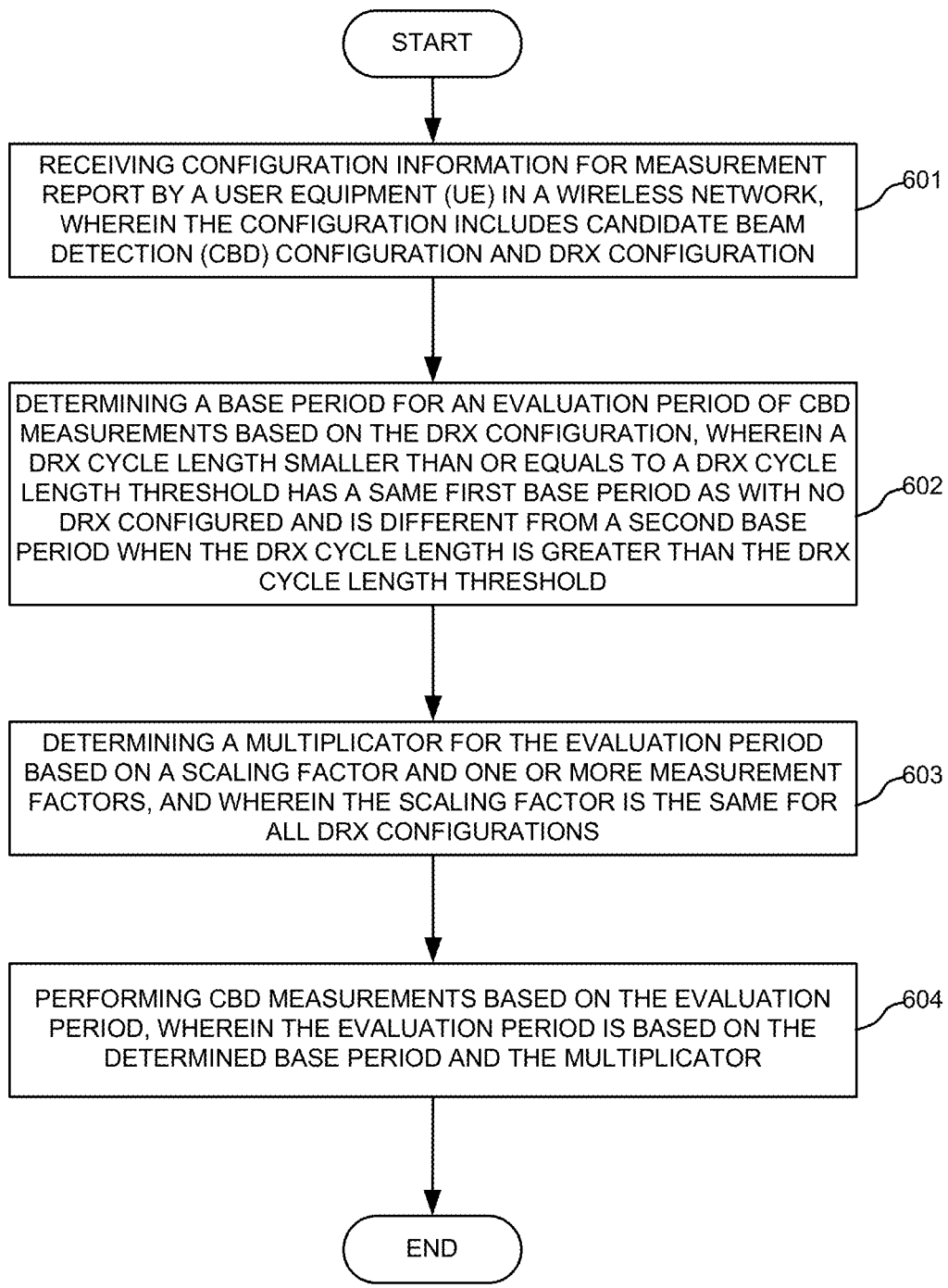
FIG. 6 illustrates an exemplary flow chart for the CBD with DRX in accordance with embodiments of the current invention.

FIG. 6 illustrates an exemplary flow chart for the CBD with DRX in accordance with embodiments of the current invention. At step 601, the UE receives DRX configuration including a DRX cycle length. At step 602, the UE determines a base period for an evaluation period of CBD measurements based on the DRX cycle length. At step 603, the UE determines determining a multiplicator for the evaluation period based on a scaling factor and one or more measurement factors. At step 604, the UE performs CBD measurements based on the evaluation period, wherein the evaluation period is based on the determined base period and the multiplicator.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving discontinuous reception (DRX) configuration including a DRX cycle length by a user equipment (UE) in a wireless network;
determining a base period for an evaluation period of candidate beam detection (CBD) measurements based on the DRX cycle length;
determining a multiplicator for the evaluation period based on a scaling factor and one or more measurement factors; and
performing CBD measurements based on the evaluation period, wherein the evaluation period is based on the determined base period and the multiplicator.

2. The method of claim 1, further comprising: receiving CBD configuration including a reference signal (RS) periodicity by the user equipment (UE) in the wireless network, wherein the base period is the RS periodicity when a DRX cycle length is smaller than a DRX cycle length threshold, and the base period is the DRX cycle length when the DRX cycle length is greater than the DRX cycle length threshold.

3. The method of claim 2, wherein the RS periodicity is a synchronization signal block (SSB) periodicity for SSB based CBD or a channel state information reference signal (CSI-RS) periodicity for CSI-RS based CBD.

4. The method of claim 1, wherein the scaling factor is the same for all DRX configurations.

5. The method of claim 1, wherein the one or more measurement factors is a measurement factor P for frequency range-1 (FR1).

6. The method of claim 1, wherein the one or more measurement factors are a measurement factor P and a measurement factor N for frequency range-2 (FR2).

7. The method of claim 1, wherein the DRX cycle length threshold is predefined in a specification for the wireless network.

8. A user equipment (UE), comprising:
a transceiver that transmits and receives radio frequency (RF) signal with a base station in a new radio (NR) network;
a configuration circuit that receives discontinuous reception (DRX) configuration including a DRX cycle length;
a base period circuit that determines a base period for an evaluation period of candidate beam detection (CBD) measurements based on the DRX cycle length;
a factor circuit that determines a multiplicator for the evaluation period based on a scaling factor and one or more measurement factors; and
a measurement circuit that performs CBD measurements based on the evaluation period, wherein the evaluation period is based on the determined base period and the multiplicator.

9. The UE of claim 8, wherein the configuration circuit further receives CBD configuration including a reference signal (RS) periodicity in the wireless network, wherein the base period is the RS periodicity when a DRX cycle length is smaller than a DRX cycle length threshold, and the base period is the DRX cycle length when the DRX cycle length is greater than the DRX cycle length threshold.

10. The UE of claim 9, wherein the RS periodicity is a synchronization signal block (SSB) periodicity for SSB based CBD or a channel state information reference signal (CSI-RS) periodicity for CSI-RS based CBD.

11. The UE of claim 8, wherein the scaling factor is the same for all DRX configurations.

12. The UE of claim 8, wherein the one or more measurement factors is a measurement factor P for frequency range-1 (FR1).

13. The UE of claim 8, wherein the one or more measurement factors are a measurement factor P and a measurement factor N for frequency range-2 (FR2).

14. The UE of claim 8, wherein the DRX cycle length threshold is predefined in a specification for the wireless network.

\* \* \* \* \*